UNITED STATES PATENT OFFICE.

SILAS S. PUTNAM, OF BOSTON, MASSACHUSETTS, ASSIGNOR TO THE NEW ERA COFFEE COMPANY, OF SAME PLACE.

IMPROVEMENT IN TABLE-BEVERAGES.

Specification forming part of Letters Patent No. 203,191, dated April 30, 1878; application filed April 6, 1878.

*To all whom it may concern:*

Be it known that I, SILAS S. PUTNAM, of Boston, in the county of Suffolk and State of Massachusetts, have invented an improved process of treating wheat to be used for making a table-beverage; and I hereby declare the following to be a full, clear, and exact description thereof.

A table-beverage having a flavor resembling coffee, and constituting a healthful, nutritious, and pleasant substitute therefor, has long been sought by those who are unable to drink genuine coffee. Peas, beans, acorns, wheat, rye, and barley have all been tried and proved unsatisfactory, as they contain properties which render them unfit for this purpose when simply roasted.

In the preparation of cereals for making table-beverages, I have found wheat to be the most suitable, and becomes, by the treatment I have adopted, harder, more solid, and much more brittle than all others, and is far superior in delicacy of flavor. Wheat, however, contains properties which render it worthless for a table-beverage when simply roasted, the glutinous and oily granules which fill the angular cells of the surface of the seed proper causing it to deteriorate and very soon become rancid after roasting, the wheat, after being roasted, having the appearance of containing a much larger quantity of oil than before, the two elements—the gluten and the oil—by the chemical change produced by roasting apparently combining into one element of oil in a greatly-increased quantity.

My present invention has for its object to perfect the preparation of the wheat, and thereby overcome the above-mentioned difficulties; and my invention consists in soaking the wheat in a weak solution of bicarbonate of soda, and then in cold water only, whereby the oily matter is partially removed and the glutinous matter undergoes a change; then subjecting the wheat to the action of hot or boiling water, or the vapor arising therefrom, to remove the remaining oily element and still further convert the glutinous matter and change the character of the starch corpuscles, and drying and then roasting the wheat, by which process it is particularly adapted for use as a substitute for coffee.

To enable others skilled in the art to understand and use my invention, I will proceed to describe the manner in which I have carried it out.

The wheat is first placed in a cask or other receptacle of suitable size, and then covered with a weak solution of bicarbonate of soda—about one pound of soda to ten gallons of water—and allowed to soak therein for a period of about six hours; after which the liquid is drawn off and replaced by the same quantity of pure cold water, in which it is allowed to remain for a further period of about nine hours, when the water is drawn off and replaced by the same quantity of fresh water, in which it is allowed to soak for a still further period of about nine hours; at the expiration of which time the water is again drained off, the entire process of soaking occupying about twenty-four hours.

The wheat now appears nearly white, the glutinous properties being changed, and the oily properties, which fill the angular cells of the surface of the seed proper and which cause it to deteriorate, and soon become rancid after roasting, having been almost entirely extracted, without in the least rupturing the testa or outer covering. The wheat is now placed in a large covered kettle or boiler supplied with water from a tank or reservoir through a pipe extending to the bottom of the kettle, and then heated, the water being supplied in quantities only sufficient to allow the formation of vapor without water-soaking the wheat. The wheat is subjected to the action of this moist heat for about one and one-half hour, or until it becomes semi-transparent or translucent, which entirely converts all of the gluten and removes the oily properties remaining in the wheat, the starch corpuscles having apparently been changed into a solid albuminous element, so that, in this respect, the wheat now becomes more like the coffee-berry in its nature, and will granulate more perfectly after roasting. The wheat is now removed from the kettle and spread thinly upon screens, where it remains exposed to the atmosphere from three to four days, being turned several times per day; after which the wheat is placed in a large oven or drying-room, where it is allowed to remain twenty-four hours, the oven or room being constantly supplied, by means of a blower, with a blast of fresh hot air at a temperature of about 200° Fahrenheit, which leaves the wheat dry, solid, hard, brittle, and almost transparent, and in a perfect condition for roasting. The wheat is then roasted until it assumes a light brown color, care being had to avoid charring.

It is now ready to be ground for use, and when ground will granulate equal to the best coffee, a table-beverage made therefrom being highly flavored, exceedingly palatable, nutritious, and very healthful, as it is entirely free from all objectionable properties.

Wheat prepared in accordance with the above-described process is not intended to be mixed with or to form an adulteration of coffee, but to be used as a substitute therefor; and the subject-matter of this invention has especial reference to that described in Letters Patent of the United States, No. 194,618, granted me on the 28th day of August, 1877, for improvement in substitutes for coffee.

What I claim as my invention, and desire to secure by Letters Patent, is—

In preparing table-beverages the process of treating wheat, consisting in first soaking it in an alkaline solution, and then in cold water, and afterward subjecting the wheat to the vapor of heated water for a sufficient length of time to cook the same, whereby the glutinous matter is converted and the oily granules entirely removed, and then drying and finally roasting the wheat, substantially as described.

Witness my hand this 28th day of March, 1878.

SILAS S. PUTNAM.

In presence of—
 N. W. STEARNS,
 P. E. TESCHEMACHER.